Aug. 6, 1935.    H. A. BAKKE    2,010,710
CONNECTING LINK
Filed July 21, 1933
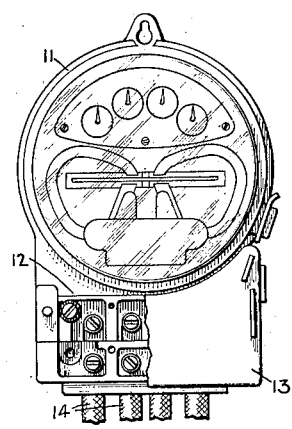
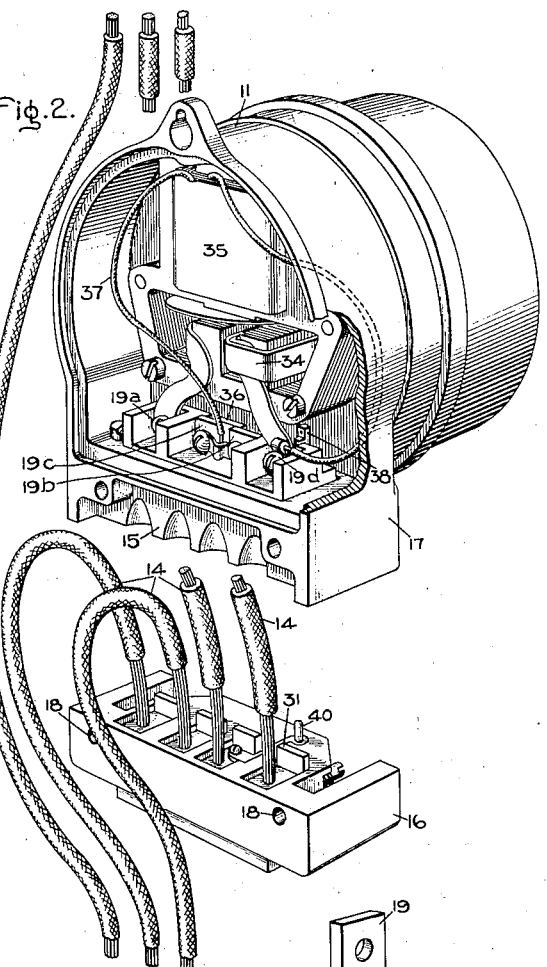
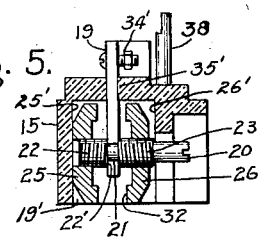
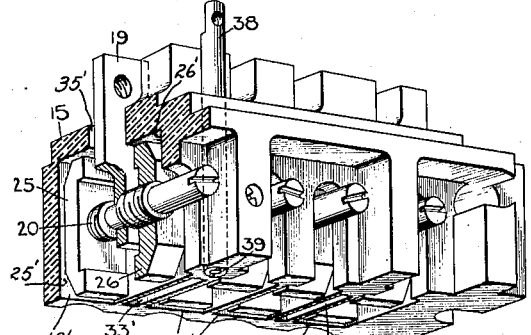
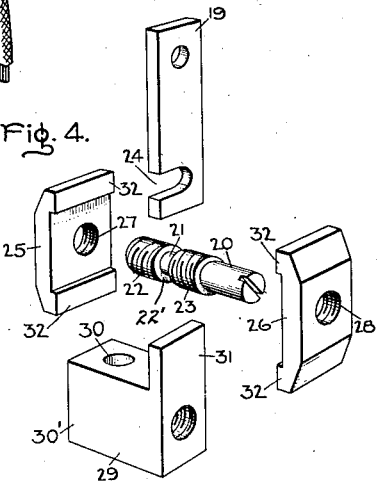
Inventor:
Hans A. Bakke,
by Harry E. Dunham
His Attorney.

Patented Aug. 6, 1935

2,010,710

UNITED STATES PATENT OFFICE 2,010,710

CONNECTING LINK

Hans A. Bakke, Swampscott, Mass., assignor to General Electric Company, a corporation of New York Application July 21, 1933, Serial No. 681,531

12 Claims. (Cl. 175—183)

My invention relates to electrical connecting links and test blocks.

It is an object of my invention to provide a simple, reliable, easily constructed, and relatively inexpensive connecting and disconnecting device for testing and other purposes in connection with electrical apparatus.

It is another object of my invention to provide a test block for use with electrical meters, instruments, and other devices which will permit the isolation of an electrical device from an electrical system without handling the permanent wiring of the system. It is also an object of my invention to provide a terminal block for electrical devices which will not only permit electrical isolation of the device from an electrical system for test purposes, but will also permit the device to be readily removed from and replaced in its operating position without the necessity for handling any of the permanent wiring of the electrical system with which the device is used. Other and further objects and advantages will become apparent as the description proceeds.

In accordance with my invention in its preferred form, an electrical device such as a meter for example, is provided with a terminal block comprising two parts composed of insulating material, each of which has connecting lugs supported therein. The lugs of one part are connected to the circuits of the electrical device and the lugs of the other part are connectible to the permanent wiring of the electrical system with which the device is to be used. One of the parts of the terminal block includes screw-operated clamping devices for clamping corresponding lugs of either part of the terminal block between connecting links to permit easy connection and disconnection of the electrical circuits.

The features of my invention which I believe to be novel and patentable are pointed out in the claims appended hereto. A better understanding of my invention itself however, may be obtained from reference to the following description in connection with accompanying drawing in which Fig. 1 represents an electrical meter employing a test block consisting of one embodiment of my invention; Fig. 2 illustrates in perspective from the rear the meter shown in Fig. 1 with the parts of the terminal block separated; Fig. 3 represents in perspective and partially in cross-section the two parts of the terminal block; Fig. 4 is an exploded view showing the means for connecting and disconnecting corresponding lugs in the test block; and Fig. 5 is a cross-sectional view of the test block with the parts in position for making a test.

Referring now more in detail to the drawing in which like reference characters refer to like parts throughout, I have shown in Fig. 1 an electrical meter 11 having a terminal block 12 and having its terminal cover 13 partially broken away to show a portion of the terminal block 12. The meter of Fig. 1 is shown with the conductors 14 of an electrical system with which the meter is to be used entering from the bottom which is the most usual arrangement for indoor wall mounted meters. In Fig. 2, the conductors 14 are brought along the back of the meter and enter the terminal block from the top, which has been found an advantageous arrangement where vertical space is limited as, for example, where a meter is to be mounted in an enclosed casing. The arrangement which permits bringing conductors 14 in from either above or below will be explained hereinafter.

The terminal block 12 consists of two insulating pieces or parts 15 and 16, the part 15 being fastened to the frame 17 of the meter 11 and the part 16 being attached to the part 15 in a manner which will be explained hereinafter. But the part 16 may in addition, if desired, be permanently attached in the location where the meter 11 is mounted by means of screws (not shown) passing through holes 18 into a wall or panel serving as a meter support.

The insulating piece 15 contains a plurality of flat lugs 19 which may be attached to the circuits of an electrical meter 11 or other device with which the terminal block is to be used. Insulating piece 15 also contains a plurality of differential screws 20 having portions of reduced diameter 21 between oppositely threaded portions 22 and 23, and the lugs 19 are provided with slots 24 to receive the cutaway portions 21 of the differential screw 20. Connecting strips 25 and 26 are provided having oppositely threaded openings 27 and 28 engaging threads 22 and 23 of the differential screws 20.

The lower insulating piece 16 contains a plurality of lugs 29 having openings 30 extending therethrough to receive conductors 14 of the permanent wiring of an electrical system, screws 20' to fasten the conductors 14 in holes 30, and projecting ears 31. Since the holes 30 are open at both ends and the portion 30' of lug 29 extends backwards, the conductors 14 may be inserted from either above or below.

The clamping strips 25 and 26 are provided with contacting surfaces 32 at which electrical contacts may be made between the clamping strips 25 and 26, the lugs 19 and projecting ears 31 of lugs 29 by drawing the strips 25 and 26 together with the differential screw 20.

Owing to the fact that the lugs 29 are fixed in position in the insulating piece 16 and the projections 33 in piece 16 cooperating with recesses 33' in piece 15 fix the relative positions of pieces 15 and 16, rotation of differential screws 20 in the appropriate direction must result in separating both connecting strips 25 and 26 from lugs 31 so that the electrical connection between connecting strips 25 and 26 and the projecting ear 31 of lug 29 may be positively interrupted. On the other hand a good electrical contact may be made between lugs 19 and 29 by drawing connecting strips 25 and 26 together since slight inaccuracies in the dimensions of the conducting parts are overcome by the rocking action of the strips 25 and 26 as the standard design of screw threads allows sufficient pivoting for this purpose and the fact that contacting surfaces 32 of strips 25 and 26 project slightly, assures the making of good contact even with strips 25 and 26 slightly out of parallel.

When a meter equipped with a test block in accordance with my invention is to be tested the meter circuits are opened by turning screws 20 to spread the clamping strips 25 and 26. As will be understood by those skilled in the art, suitable test clips may be attached to the heads of screws 20 to connect the meter 11 in to testing circuit. If desired a test meter may also be connected in series with meter 11 and the load by connecting suitable test clips of the test meter to the heads of screws 20 and 20', or screws 20 may be joined by jumpers to shunt out the meter circuits. In order to insure good electrical contact between screws 20 and lugs 19 for testing, the insulating piece 15 is so proportioned that each lug 19 is positioned nearer one side 25' than the other 26' of the chambers 19' provided in piece 15 for the clamping strips 25 and 26. Consequently when the strips 25 and 26 have been spread as far as possible (Fig. 5), strip 25 will be against the side 25' of piece 15 and cause the shoulder 22' of screw 20 to bear against lug 19, making an adequate contact for test purposes.

Inasmuch as the lead-connecting bolts 34' (Fig. 5) as well as the connections to the meter windings prevent the withdrawal of the lugs 19 through the openings 35' of the insulating piece 15 further into chambers 19', screws 20 and conducting strips 25 and 26 are retained within the chambers 19' and there is no danger that they will become lost whether the conducting strips are in the drawn-together or spread-apart positions.

The test block may be used, if desired, merely for quickly connecting and disconnecting the circuits of the electric meter 11 for test and other purposes. However, the fact that the terminal block 12 is separable into parts 15 and 16 also permits completely removing the meter 11 from its operating position after the connecting strips 25 and 26 have been spread by means of the differential screw 20. This permits having meters collected for test purposes or replacement by unskilled men since the operation of loosening the differential screws 20 and removing the meter is very simple. Consequently, the meter may be tested at a central laboratory by skilled testers who may devote all their time to testing and who may have available for use more accurate and more convenient test equipment than could readily be transported to the premises where the meters are installed. Another obvious advantageous feature of my invention is the fact that insulating piece 16 being permanently fastened in place, holds the wiring 14 rigidly in position even when the meter 11 has been removed.

The meter connections shown in Fig. 2 are for a two-wire circuit having a current coil 34 connected across the outer lugs 19a and 19d and a potential winding 35 connected between outer lug 19d and the middle lugs 19b and 19c which are bridged by means of a conducting strip 36. It will be understood that in the case of three-wire circuits, conducting strip 36 is removed and a second current coil is connected to the middle lugs 19b and 19c, the second lead 37 of the potential winding 35 being connected to one of the middle lugs 19b or 19c in common with the current connection. To facilitate isolation of the current windings from the potential windings for test purposes, a separate potential link may be used in a manner well understood in the art, or if desired I may also employ a potential connector of the type disclosed in the copending application of T. A. Abbott, S. N. 681,508, filed concurrently herewith, and assigned to the same assignee as the present application. This potential connector consists of a conducting pin 38 to which the lead 37 of the potential winding 35 may be connected when the meter is used with three-wire circuits. A socket 39 is provided in the lower end of pin 38 and a pin 40 is provided in the insulating piece 16 connected to lug 31b by means of a conducting strip 41. The pin 40 engages the socket 39 in pin 38 to close the potential circuit when the pieces 15 and 16 are placed together and to open this side of the potential circuit when the pieces 15 and 16 are separated.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In combination, an electrical meter having a casing current leads and a test block therefor, comprising an insulating upper piece rigidly supported in said meter casing, a plurality of lugs supported thereby and each attached to one of said current leads, a plurality of clamping devices in said upper piece, one of which is associated with each of said lugs, a removable insulating lower piece, a plurality of lugs supported thereby and connectible to the conductors of an electrical circuit with which said meter is to be used, each of the clamping devices in said upper piece serving to permit forming and interrupting an electrical connection between one of the lugs of said upper piece and one of the lugs of said removable lower piece without removal of said lower piece.

2. In combination, an electrical device having current leads and a test block therefor, comprising an insulating upper piece rigidly supported in said device, a plurality of lugs supported therein and each attachable to one of said current leads, a removable insulating lower piece independently separable from and external to said device, a plurality of lugs supported in said lower piece and connectible to the conductors of an electrical circuit with which said device is to be used, and means retained in one of said insulating pieces associated with each of the lugs in said piece for forming and interrupting electrical connections between the lugs of one insulating piece and corresponding lugs of the other insulating piece without removing said lower piece to permit isolating and removing said electrical device from the electrical system with which it is used without handling the permanent wiring of said system.

3. In combination, an electrical device having current leads and a test block therefor, comprising a plurality of lugs each connected to one of said leads, a plurality of lugs connected to the conductors of an electrical system with which said device is to be used, and a plurality of electrically conducting clamping devices, each comprising a differential screw and a pair of strips of conducting material placed on either side of the lugs to be electrically connected, adapted when drawn together to make contact at one end with one of the first-mentioned set of lugs and at the other end with one of the second mentioned set of lugs and having holes therein oppositely threaded, said differential screw engaging the threaded holes in said strip to permit drawing together and spreading said strips by rotation of said screw, thereby making and interrupting electrical connections between corresponding lugs.

4. In combination, an electrical device having current leads and a test block therefor, comprising a plurality of insulated chambers, a plurality of lugs, each contained in one of said chambers and connected to one of said leads, a plurality of lugs also contained, one each, in said chambers and connected to the conductors of an electrical system with which said device is to be used, and a plurality of electrically conducting clamping devices in said chambers each comprising a screw projecting from the containing chamber and substantially prevented from moving perpendicularly to its axis and a conducting strip arranged when drawn down to make contact at one end with one of the first-mentioned set of lugs and at the other end with one of the second-mentioned set of lugs and having a threaded hole therein engaged by said screw to permit drawing down and backing off said strip by rotation of said screw, thereby making and interrupting electrical connections between corresponding lugs.

5. In combination, an electrical device having a plurality of leads and a test block for said device, comprising an insulating upper piece, a plurality of lugs supported therein and each attachable to one of said leads, a removable insulating lower piece, a plurality of lugs supported thereby and connectible to the conductors of an electrical circuit with which said device is to be used, a plurality of conducting strips having threaded holes therein and means for transversely moving said strips to form and interrupt electrical connections between the lugs of one insulating piece and corresponding lugs of the other insulating piece to permit isolating and removing said electrical device from the electrical system with which it is used without handling the permanent wiring of said system.

6. An electrical connecting and disconnecting device, comprising a pair of lugs between which an electrical connection is to be made, a pair of connecting strips having oppositely threaded holes therein, and a differential screw, said conducting strips being located with their ends overlapping said lugs and having the threaded holes therein engaging said differential screw so that said conducting strips may be drawn together and spread apart by rotating said screw to make and interrupt electrical connections between said lugs.

7. In combination with an electrical system having permanent wiring, a removable electrical device for use with said system having a terminal block with two parts, one part of said terminal block being rigidly attached to said device and including lugs electrically connected to said device, and the other part of said terminal block being independently separable from and external to said device and including lugs connected to the wiring of said electrical system, one part of said terminal block also including clamping means retained therein and adapted for making electrical connections between corresponding lugs of said terminal block parts without separation of the terminal block parts and serving mechanically to attach to each other and detach the parts of said terminal block, thereby permitting the removal and replacement of said electrical device and the electrical isolation of said device without handling the wiring of said electrical system or disturbing the connection between said device and its terminal block.

8. In combination, an electrical device having current leads and a test block therefor, comprising a plurality of lugs each connected to one of said leads, a plurality of lugs connected to the conductors of an electrical system with which said device is to be used, and a plurality of connecting devices each including a link movable to a position making contact between one of the first-mentioned set of lugs and one of the second-mentioned set of lugs and also movable to a position interrupting the electrical connection between said lugs and out of direct contact with either of said lugs, said connecting devices comprising relatively movable parts, which are secured in said test block, whereby their loss is prevented whether the connecting devices are in the circuit-making or the circuit-interrupting position.

9. In combination, an electrical device having current leads and a test block therefor, comprising a plurality of lugs each connected to one of said leads, a plurality of lugs connected to the conductors of an electrical system with which said device is to be used, and a plurality of electrically-conducting clamping devices each comprising an adjusting screw and a conducting strip arranged when drawn down to make contact at one end with one of the first-mentioned set of lugs and at the other end with one of the second-mentioned set of lugs and having a hole therein engaging said screw to permit drawing down and backing off said strip by rotation of said screw, thereby making and interrupting electrical connections between corresponding lugs, said screws each having a head accessible for adjusting said clamping devices or for making connections to electrical test clips and having a shoulder engaging the associated lead connected lug, said test block including a stop for preventing said conducting strips being backed off more than a predetermined distance, thereby forcing the shoulder in said screw against said lead-connected lug in the circuit-interrupting position and insuring good electrcal contact between said lead-connected lug and said adjusting screw for test purposes.

10. A screw operated circuit opening and closing device comprising a pair of stationary contacts, a movable contact for electrically connecting said stationary contacts, and a screw free to rotate but substantially prevented from moving in a direction perpendicular to its axis and arranged to move said movable contact into and out of engagement with said stationary contacts to open and close an electrical circuit therebetween, said screw having a shoulder engaging a portion of one of said stationary contacts in the circuit opening position to insure electrical contact between said stationary contact and said screw for test purposes.

11. A screw operated circuit opening and closing device comprising a pair of stationary contacts, a movable contact for electrically connecting said stationary contacts, a screw engaging said movable contact to move the same laterally into and out of engagement with said stationary contacts to open and close a circuit therebetween, and means for substantially preventing motion of said screw perpendicular to its axis to secure said movable contact and said screw in said device whereby their loss is prevented whether said contact is in the circuit opening or circuit closing position.

12. In combination, an electrical device having current leads and a test block therefor, comprising an insulating piece having a plurality of chambers therein, a plurality of lugs each projecting into one of said chambers and connected to one of said leads, lugs connected to the conductors of an electrical system with which said device is to be used and each projecting into one of said chambers, movable connecting links for making and interrupting electrical connections between corresponding lugs and operating screws engaging said connecting links and controlling their positions solely by rotation of the operating screws, said links being located in said chambers whereby their loss is prevented.

HANS A. BAKKE.